United States Patent [19]

Karr

[11] 4,202,364
[45] May 13, 1980

[54] METHOD FOR SEPARATING FLUIDS BY MEANS OF PRESSURE DIFFERENTIAL

[76] Inventor: Graydon L. Karr, 2237 Swainwood Dr., Glenview, Ill. 60025

[21] Appl. No.: 964,740

[22] Filed: Nov. 29, 1978

[51] Int. Cl.$^2$ .................. H01M 4/20; H01M 4/70
[52] U.S. Cl. ........................................ 137/13; 137/604
[58] Field of Search ................. 137/604, 563, 1–3, 137/8, 10, 12, 13; 366/150, 176, 177; 210/513, 532 R, 533–535, 83

[56] References Cited

U.S. PATENT DOCUMENTS

| | | | |
|---|---|---|---|
| 2,247,116 | 6/1941 | Day | 137/563 |
| 3,658,302 | 4/1972 | Duthion | 137/604 |
| 4,058,296 | 11/1977 | Wetherby | 137/604 |

*Primary Examiner*—Frank Sever
*Attorney, Agent, or Firm*—Merriam, Marshall & Bicknell

[57] ABSTRACT

A system for preventing fluid contamination and more specifically a system for preventing the contamination of a first fluid, such as a cooling and lubricating fluid used for cooling and lubricating a workpiece, with a second fluid, such as hydraulic or other foreign fluids used in association with a machine adapted to perform one or more machining operations on a workpiece.

1 Claim, 2 Drawing Figures

METHOD FOR SEPARATING FLUIDS BY MEANS OF PRESSURE DIFFERENTIAL

BACKGROUND OF THE INVENTION

In the course of machining workpieces, it is necessary to simultaneously lubricate the workpiece and pass a cooling medium over it to transfer heat generated during a machining operation. It has been found that an oil-water emulsion serves to accomplish the optimum.

Unfortunately, in some instances other fluid mediums used by the machine, e.g., gear-box lubricants, hydraulic fluids, mix with the oil-water emulsion, causing a breakdown of the oil-water emulsion. The result has been that the workpiece and machine tool have not been properly lubricated and cooled. More specifically, it has been found, for example, that a source of the contaminating fluid has been hydraulic fluid adapted for use with a machine, e.g., hydraulic means for moving the machine into and out of an operative position relative to a workpiece. It has been found that fluid escapes from the machine due to a number of reasons, e.g., seal leakage, overflow from hydraulic oil supply tanks. What occurs is that the hydraulic fluid drips onto the floor where it flows to a collecting trough. The trough is the same trough which collects oil-water emulsion which drops to the floor or is otherwise directed to the collecting trough. The excess hydraulic fluid, often referred to as "tramp" fluid, mixes with and contaminates the emulsion and causes an undesirable breakdown of the oil and water in the oil-water emulsion supply tank. More than a minor amount of tramp oil in the oil-water emulsion renders the emulsion unstable and necessitates shutting down the machining operation until the contaminated fluid is removed from the system. It can be readily appreciated that shutting down the machining operation can be quite costly.

What is desired is a system adapted for use with trough collecting stations presently employed for collecting overflow fluids whereby the second fluid is collected and are prevented from contaminating the main supply tank of first fluid.

SUMMARY OF THE INVENTION

The system of the present invention involves the utilization of one or more negative pressure stations located at areas where fluid contaminants collect whereby the fluid to be spearated is removed from the collecting stations into a collection tank.

Briefly the invention comprises the utilization of a collecting trough into which the fluid contaminant normally drains. A drain line is positioned below the trough or other collecting station and fluid collected in the trough is pulled into the drain line by an ejection means disposed within the drain line. The ejection means serves to create a negative pressure or suction at the trough collecting station, so that fluid will pass into the drain line and through an ejection means into a collecting tank. A pump serves to pump fluid from the collection tank back through the ejection means where the fluid is recirculated back into the collection tank. As fluid is pumped from the collection tank through the ejection means, a vacuum is created at an ejection means port attached to the drain line so that a vacuum or reduced pressure area is created at the trough collecting station. The problems which previously occurred are obviated and machining operations can be performed on a workpiece without need to shut down the operation.

DETAILED DESCRIPTION

Figure 1:
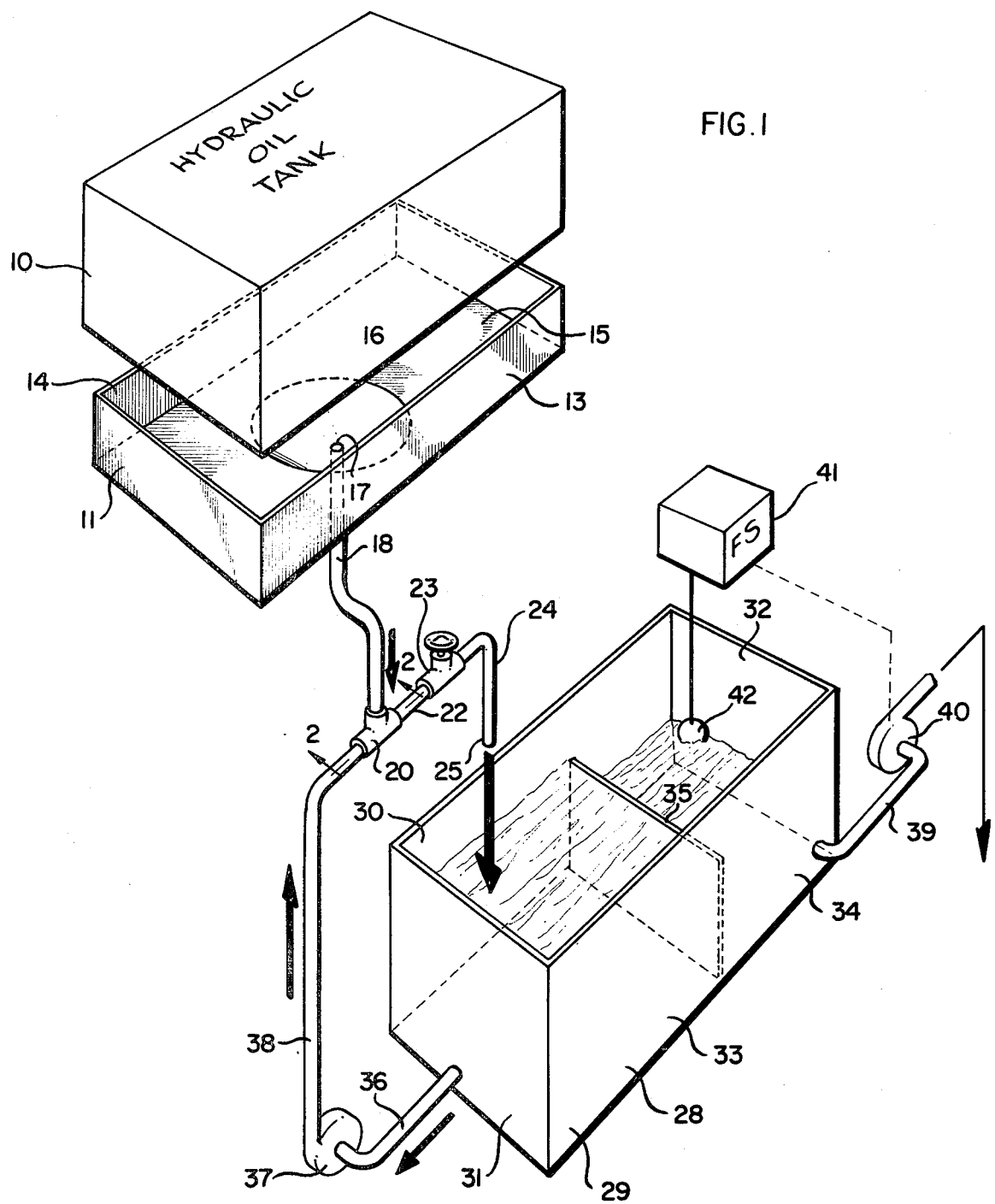
FIG. 1 shows a perspective view of a diagram of the fluid drainage system of the present invention; and, FIG. 2 shows a section view of the ejection valve of the present invention taken along lines 2—2 of FIG. 1.

Referring to the drawings, there is depicted a hydraulic oil tank 10 which generally is situated in close proximity to a relatively large machine, not shown, adapted, for example, to be indexed to perform a plurality of machining operations on a workpiece or to be moved into and out of position relative to the workpiece. The indexing operations are hydraulically actuated and the source of hydraulic fluid is tank 10 which is connected by suitable conduit means to the machine. In some cases, a plurality of hydraulic fluid supply tanks 10 are positioned adjacent to the various machines adapted to perform machine operations on one or more workpieces. Trough 11 is disposed below tank 10 to catch any overflow of hydraulic fluid from the tank. Instead of the trough 11, a trench disposed in the floor below the tank could be utilized to catch the leakage or overflow fluid from tank 10.

The trough or trench has side walls 13, 14 and a bottom wall 15. Bottom wall 15 can be flat or, sloped if desired. A funneled wall 16 is located in wall 15. Wall 16 is tapered inwardly to form an aperture or exit port 17. Port 17 is suitably connected in a leak-free manner to one end of conduit 18. The remaining end of drain line 18 is threaded or otherwise suitably connected to port 19 of ejection means 20.

Conduit 22 is threaded at one end to port 21 of ejection means 20 while the remaining end of conduit 22 is connected to the inlet side of valve 23. One end of conduit 24 is connected to the outlet side of valve 23 and the remaining end 25 of conduit 24 opens into portion 33 of catch tank 28.

Tank 28 comprises side walls 29, 30 connected to end walls 31, 32. The tank is separated into portions 33, 34 by separator wall 35. Conduit 36 is attached to the bottom of end wall 31 while the remaining end of conduit 36 is connected to pump 37. Conduit 38 has one end connected to pump 37 while the remaining end is connected to port 38 of ejection means 20.

One end of conduit 39 is attached to portion 34 at the bottom of tank side wall 29. The remaining conduit end is conducted to sump pump 40. A flow switch 41 is connected to and adapted to actuate pump 40. When fluid, which overflows from tank portion 33, reaches a certain selected level in tank portion 34 indicator 42 is moved and switch 41 is actuated.

Figure 2:
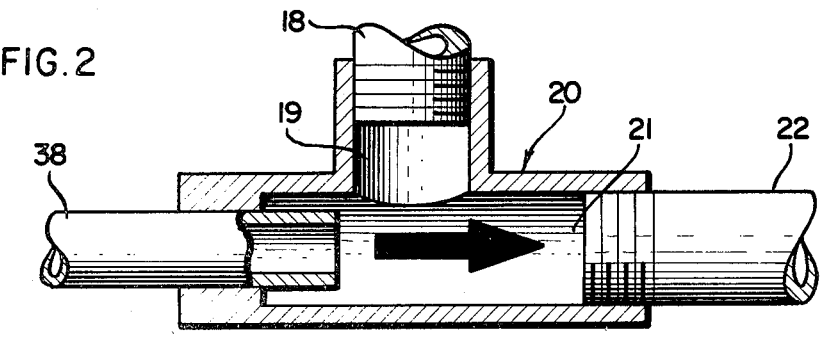

As seen more clearly in FIG. 2, ejection means 20 includes an aspirator port 38, the diameter of the aspirator port being smaller than the diameter of exit port 21. As fluid passes through port 38 in the direction of the arrow and on through exit port 21, an aspirating effect will be created and a vacuumn or reduced pressure area will be created at the ejection means entry port 19. The effect is that a reduced pressure will occur in drain line 18 which serves to pull any fluid located near aperture 17 through drain line 18.

In operation, any fluid, which overflows or otherwise leaks from the tank 10 or other source of tramp fluid will fall to trough 11. The oil will flow down the funneled wall 16.

When valve 23 is opened and pump 37 actuated, oil in tank portion 33 will be drawn from the tank and passed through conduit 36, pump 37, and conduit 38. The fluid will pass through aspirator port 38 and out exit port 21 at which time it will create a negative pressure at entry port 19. The negative pressure in line 18 serves to pull fluid located near the area of aperture 17 into drain line 18 and out ejection means exit port 21. The fluid then passes into conduit 22 where it empties into tank portion 33.

When the oil in tank portion 33 reaches the same height as the top of wall 35, the fluid overflows into tank portion 34. When the fluid in portion 34 reaches a certain level, indicator 42 causes switch 41 to actuate pump 40 whereby fluid in portion 34 is withdrawn from tank portion 34 until the fluid level is reduced at which time switch 42 will cause pump 40 to stop.

When valve 23 is closed, pump 37 can be actuated to flush line 18 and opening 17 to remove foreign particles that may collect near opening 17. Valve 23 can then be opened and the flushed material will pass to tank portion 33.

While the system of the present invention has been illustrated with a hydraulic oil tank, it is appreciated that the system of the present invention could be employed at other locations where fluid, which is to be kept from the oil-water emulsion, can be pulled into a drain line such as 17 by means of suitable fluid ejection means.

Further, it is appreciated that while a trough has been shown, the system of the present invention could be employed with installations where trenches are disposed in the floor below or adjacent the machines to catch the tramp oil. Similarly, the conduit lines, flow switches, and pumps employed for the system of the present invention are presently available in the art and well-known to those persons skilled in the art.

While an example of the first fluid has been disclosed as a water-oil emulsion, it is appreciated that other fluids are being utilized, e.g., a mineral oil with non-water additives, a water with non-oil additives.

Finally, while it is desired that the first and second fluids be separated completely, it is appreciated that if a relatively minor amount of the first fluid is collected with the second or tramp fluid, the system of the present invention will not be adversely affected.

The foregoing detailed description has been given for clearness of understanding only, and no unnecessary limitations should be understood therefrom, as modifications will be obvious to those skilled in the art.

What is claimed is:

1. The method of removing tramp oil from a tramp oil collecting station in a system according to the steps of:
   providing a tramp oil collection trough means for receiving a fluid to be removed;
   providing a tramp oil drain line means in said trough means;
   providing an ejection means in said drain line means;
   creating a pressure differential between the air pressure in said trough means and the drain line pressure with said ejection means, whereby the pressure is reduced in said drain line and tramp oil in said trough means will enter said drain line;
   passing tramp oil collected in said trough means through said drain lines; and,
   providing a tramp oil collection tank for receiving tramp oil which passes through said drain line;
   whereby tramp oil collected in said trough will be pulled through said drain line into said collection tank by a higher pressure stream from said collection tank which is passed through said ejection means.

* * * * *